(12) United States Patent  
Friedlander et al.

(10) Patent No.: US 9,741,138 B2  
(45) Date of Patent: Aug. 22, 2017

(54) NODE CLUSTER RELATIONSHIPS IN A GRAPH DATABASE

(71) Applicant: INTERNATIONAL BUSINESS MACHINES CORPORATION, Armonk, NY (US)

(72) Inventors: Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 13/648,801

(22) Filed: Oct. 10, 2012

(65) Prior Publication Data

US 2014/0098101 A1 Apr. 10, 2014

(51) Int. Cl.  
G06T 11/20 (2006.01)  
G06F 17/30 (2006.01)

(52) U.S. Cl.  
CPC ...... G06T 11/206 (2013.01); G06F 17/30587 (2013.01)

(58) Field of Classification Search  
None  
See application file for complete search history.

(56) References Cited

U.S. PATENT DOCUMENTS

| | | | |
|---|---|---|---|
| 5,450,535 A * | 9/1995 | North | 345/440 |
| 5,664,179 A | 9/1997 | Tucker | |
| 5,689,620 A | 11/1997 | Kopec et al. | |
| 5,701,460 A | 12/1997 | Kaplan et al. | |
| 5,943,663 A | 8/1999 | Mouradian | |
| 5,974,427 A | 10/1999 | Reiter | |
| 6,167,405 A | 12/2000 | Rosensteel et al. | |
| 6,199,064 B1 | 3/2001 | Schindler | |
| 6,269,365 B1 | 7/2001 | Kiyoki et al. | |
| 6,275,833 B1 | 8/2001 | Nakamura et al. | |
| 6,314,555 B1 | 11/2001 | Ndumu et al. | |
| 6,334,156 B1 | 12/2001 | Matsuoka et al. | |
| 6,353,818 B1 | 3/2002 | Carino, Jr. | |
| 6,381,611 B1 | 4/2002 | Roberge et al. | |

(Continued)

FOREIGN PATENT DOCUMENTS

| | | |
|---|---|---|
| CN | 101866342 A | 10/2010 |
| CN | 102201043 | 9/2011 |

(Continued)

OTHER PUBLICATIONS

Automated Tag Clustering: Improving Search and Exploration in the TagSpace, Grigory Begelman et al, Collaborative Tagging Workshop www2006, May 2006.*

(Continued)

*Primary Examiner* — Barry Drennan  
*Assistant Examiner* — Jason Pringle-Parker  
(74) *Attorney, Agent, or Firm* — John R. Pivnichny; Law Office of Jim Boice

(57) ABSTRACT

A processor-implemented method, system, and/or computer program product manages nodes in a graph database. Graph nodes in a graph database are organized into graph node clusters. A cluster edge, which describes a relationship between two of the graph node clusters, is generated to logically associate those two graph node clusters with one another.

19 Claims, 12 Drawing Sheets

(56) References Cited

U.S. PATENT DOCUMENTS

| | | | |
|---|---|---|---|
| 6,405,162 B1 | 6/2002 | Segond et al. |
| 6,424,969 B1 | 7/2002 | Gruenwald |
| 6,553,371 B2 | 4/2003 | Gutierrez-Rivas et al. |
| 6,633,868 B1 | 10/2003 | Min et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 | 1/2006 | Burt |
| 7,019,740 B2 | 3/2006 | Georgalas |
| 7,047,253 B1 | 5/2006 | Murthy et al. |
| 7,058,628 B1 | 6/2006 | Page |
| 7,103,836 B1 | 9/2006 | Nakamura et al. |
| 7,152,070 B1 | 12/2006 | Musick et al. |
| 7,191,183 B1 | 3/2007 | Goldstein |
| 7,209,923 B1 | 4/2007 | Cooper |
| 7,337,174 B1 | 2/2008 | Craig |
| 7,441,264 B2 | 10/2008 | Himmel et al. |
| 7,477,165 B2 | 1/2009 | Fux |
| 7,493,253 B1 | 2/2009 | Ceusters et al. |
| 7,503,007 B2 | 3/2009 | Goodman et al. |
| 7,523,118 B2 | 4/2009 | Friedlander et al. |
| 7,523,123 B2 | 4/2009 | Yang et al. |
| 7,571,163 B2 | 8/2009 | Trask |
| 7,679,534 B2 | 3/2010 | Kay et al. |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Angell et al. |
| 7,970,759 B2 | 6/2011 | Friedlander et al. |
| 7,996,373 B1 | 8/2011 | Zoppas et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,161,048 B2 | 4/2012 | Procopiuc et al. |
| 8,199,982 B2 | 6/2012 | Fueyo et al. |
| 8,234,285 B1 | 7/2012 | Cohen |
| 8,250,581 B1 | 8/2012 | Blanding |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,489,641 B1 | 7/2013 | Seefeld et al. |
| 8,620,958 B1 | 12/2013 | Adams et al. |
| 8,799,323 B2 | 8/2014 | Nevin, III |
| 8,849,907 B1 | 9/2014 | Hession et al. |
| 2001/0051881 A1 | 12/2001 | Filler |
| 2002/0091677 A1 | 7/2002 | Sridhar |
| 2002/0111792 A1 | 8/2002 | Cherny |
| 2002/0184401 A1 | 12/2002 | Kadel, Jr. et al. |
| 2003/0065626 A1 | 4/2003 | Allen |
| 2003/0088576 A1 | 5/2003 | Hattori et al. |
| 2003/0149562 A1 | 8/2003 | Walther |
| 2003/0149934 A1 | 8/2003 | Worden |
| 2003/0212664 A1 | 11/2003 | Breining et al. |
| 2003/0212851 A1 | 11/2003 | Drescher et al. |
| 2004/0036716 A1 | 2/2004 | Jordahl |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0181350 A1 | 8/2005 | Benja-Athon |
| 2005/0188088 A1 | 8/2005 | Fellenstein et al. |
| 2005/0222890 A1 | 10/2005 | Cheng et al. |
| 2005/0273730 A1* | 12/2005 | Card et al. .................. 715/853 |
| 2005/0283679 A1 | 12/2005 | Heller et al. |
| 2006/0004851 A1 | 1/2006 | Gold et al. |
| 2006/0036568 A1* | 2/2006 | Moore et al. .................. 707/1 |
| 2006/0190195 A1 | 8/2006 | Watanabe et al. |
| 2006/0197762 A1* | 9/2006 | Smith et al. .................. 345/440 |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1* | 12/2006 | Madden et al. ............. 345/440 |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1 | 6/2007 | Forney |
| 2007/0136048 A1 | 6/2007 | Richardson-Bunbury et al. |
| 2007/0174840 A1 | 7/2007 | Sharma et al. |
| 2007/0185850 A1 | 8/2007 | Walters et al. |
| 2007/0239710 A1 | 10/2007 | Jing et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0147780 A1 | 6/2008 | Trevor et al. |
| 2008/0159317 A1 | 7/2008 | Iselborn et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |
| 2009/0182707 A1 | 7/2009 | Kinyon et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0030780 A1 | 2/2010 | Eshghi et al. |
| 2010/0070640 A1 | 3/2010 | Allen et al. |
| 2010/0077033 A1 | 3/2010 | Lowry |
| 2010/0088322 A1 | 4/2010 | Chowdhury et al. |
| 2010/0125604 A1 | 5/2010 | Martinez et al. |
| 2010/0125605 A1 | 5/2010 | Nair et al. |
| 2010/0131293 A1 | 5/2010 | Linthicum et al. |
| 2010/0131379 A1 | 5/2010 | Dorais et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |

(56) References Cited

U.S. PATENT DOCUMENTS

| | | |
|---|---|---|
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0161073 A1 | 6/2011 | Lesher et al. |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1* | 3/2012 | Anthony et al. ............... 707/805 |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1 | 5/2012 | Siripurapu et al. |
| 2012/0131468 A1 | 5/2012 | Friedlander et al. |
| 2012/0166373 A1 | 6/2012 | Sweeney et al. |
| 2012/0191704 A1 | 7/2012 | Jones |
| 2012/0209858 A1 | 8/2012 | Lamba et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0173292 A1 | 7/2013 | Friedlander et al. |
| 2013/0191392 A1 | 7/2013 | Kumar et al. |
| 2013/0238667 A1 | 9/2013 | Carvalho et al. |
| 2013/0246562 A1 | 9/2013 | Chong et al. |
| 2013/0254202 A1 | 9/2013 | Friedlander et al. |
| 2013/0291098 A1 | 10/2013 | Chung et al. |
| 2013/0326412 A1 | 12/2013 | Treiser |
| 2013/0331473 A1 | 12/2013 | Motta et al. |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1 | 3/2014 | Medelyan et al. |
| 2014/0074892 A1 | 3/2014 | Adams et al. |
| 2014/0081939 A1 | 3/2014 | Adams et al. |
| 2014/0143891 A1 | 5/2014 | Adams et al. |
| 2014/0172417 A1 | 6/2014 | Monk et al. |
| 2014/0214865 A1 | 7/2014 | Adams et al. |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| CN | 102236701 | 11/2011 |
| CN | 102385483 A | 3/2012 |
| EP | 1566752 A2 | 8/2005 |
| EP | 1843259 A2 | 10/2007 |
| WO | 2006086179 A2 | 8/2006 |
| WO | 2007044763 A2 | 4/2007 |

OTHER PUBLICATIONS

M.J. Flynn, et al., "Sparse Distributed Memory Principles of Operation", Research Institute for Advanced Computer Science, 1989, pp. 1-60.

P. Kanerva, "Hyperdimensional Computing: an Introduction to Computing in Distributed Representation With High-Dimensional Random Vectors", Springer Science+Business Media, LLC, COGN Comput, 1, 2009, pp. 139-159.

P. Kanerva, "What We Mean When We Say "What'S the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al., "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al., "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

U.S. Appl. No. 13/342,305, Friedlander et al.—Specification Filed Jan. 3, 2012.

K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.

W. Caid et al., "Context Vector-Based Text Retrieval", Fair Isaac Corporation, Aug. 2003, pp. 1-20.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

Visual Paradigm, "DB Visual Architect 4.0 Designer'S Guide: Chapter 6—Mapping Object Model to Data Model and Vice Versa", 2007, pp. 6-2-6-26.

R. Angles et al., "Survey of Graph Database Models", ACM Computing Surveys, vol. 40, No. 1, Article 1, Feb. 2008, pp. 1-65.

Avinash Kaushik, "End of Dumb Tables in Web Analytics Tools! Hello: Weighted Sort", Sep. 7, 2010, www.kaushik.net, pp. 1-15.

U.S. Appl. No. 13/562,714, Robert R. Friedlander, et al.—Specification and Drawings Filed July 31, 2012.

J. Cheng et al., "Context-Aware Object Connection Discovery in Large Graphs", Data Engineering, 2009. ICDE '09. IEEE 25th International Conference on, pp. 856-867.

U.S. Appl. No. 13/592,905—Non-Final Office Action Mailed May 8, 2013.

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

Evaggelio Pitoura et al, "Context in Databases", University of Ioannina, Greece, 2004, pp. 1-19.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

(56) References Cited

OTHER PUBLICATIONS

U.S. Appl. No. 13/342,406—Non-Final Office Action Mailed Sep. 27, 2013.
U.S. Appl. No. 13/610,347—Non-Final Office Action Mailed Jul. 19, 2013.
U.S. Appl. No. 13/610,347—Notice of Allowance Mailed Aug. 19, 2013.
U.S. Appl. No. 13/733,052—Non-Final Office Action mailed Sep. 18, 2014.
U.S. Appl. No. 13/861,058—Non-Final Office Action mailed Dec. 11, 2014.
"Ninth New Collegiate Dictionary", Merriam-Webster Inc., 1991, pp. 77 and 242.
"The American Heritage College Dictionary", Fourth Edition, Houghton Mifflin Company, 2004, p. 44 and 262.
U.S. Appl. No. 13/680,832—Non-Final Office Action Mailed Apr. 8, 2014.
U.S. Appl. No. 13/628,853—Notice of Allowance Mailed Mar. 4, 2014.
U.S. Appl. No. 13/540,267—Non-Final Office Action Mailed Feb. 4, 2014.
U.S. Appl. No. 13/540,230—Non-Final Office Action Mailed Jan. 30, 2014.
U.S. Appl. No. 13/540,295—Non-Final Office Action Mailed Jan. 30, 2014.
U.S. Appl. No. 13/609,710—Non-Final Office Action Mailed Jan. 27, 2014.
U.S. Appl. No. 13/342,406—Notice of Allowance Mailed Mar. 20, 2014.
U.S. Appl. No. 13/628,853—Non-Final Office Action Mailed Nov. 7, 2013.
U.S. Appl. No. 13/593,905—Notice of Allowance Mailed Oct. 25, 2013.
U.S. Appl. No. 13/595,356—Non-Final Office Action Mailed Apr. 14, 2014.
U.S. Appl. No. 13/755,623—Notice of Allowance Mailed May 27, 2014.
S. Alam et al., "Interoperability of Security-Enabled Internet of Things", Springer, Wireless Personal Communication, 2011, No. 61, pp. 567-586.
U.S. Appl. No. 13/609,710—Final Office Action Mailed Jul. 24, 2014.
U.S. Appl. No. 13/755,987—Non-Final Office Action mailed Jan. 1, 2015.
S. Ceri et al., "Model-Driven Development of Context-Aware Web Applications", ACM, ACM Transactions on Internet Technology, 2007, (Abstract Only).
L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).
U.S. Appl. No. 13/621,931—Non-Final Office Action mailed Jan. 28, 2015.
U.S. Appl. No. 13/732,567—Non-Final Office Action mailed Jan. 30, 2015.
U.S. Appl. No. 14/078,135—Notice of Allowance mailed Feb. 24, 2015.
U.S. Appl. No. 13/756,051—Notice of Allowance mailed Feb. 27, 2015.
U.S. Appl. No. 13/732,567—Non-Final Office Action mailed Mar. 26, 2015.
U.S. Appl. No. 13/569,366—Non-Final Office Action mailed Jun. 30, 2015.
U.S. Appl. No. 13/610,523—Non-Final Office Action mailed Apr. 30, 2015.
U.S. Appl. No. 13/540,267—Non-Final Office Action mailed Jun. 4, 2015.
U.S. Appl. No. 13/609,710—Examiner's Answer mailed Jun. 9, 2015.
U.S. Appl. No. 13/896,461—Non-Final Office Action mailed Apr. 21, 2015.
U.S. Appl. No. 13/609,710 Decision on Appeal Mailed Nov. 4, 2016.
U.S. Appl. No. 13/562,714), Robert R. Friedlander, et al.—Specification and Drawings Filed Jul. 31, 2012.
U.S. Appl. No. 13/733,066 Examiner'S Answer Mailed Dec. 20, 2016.
U.S. Appl. No. 13/861,058 Final Office Action Mailed Dec. 29, 2016.
U.S. Appl. No. 13/896,506 Non-Final Office Action Mailed Oct. 16, 2015.
U.S. Appl. No. 13/780,779—Non-Final Office Action mailed Apr. 3, 2015.
Filippova, Katja and Keith B. Hall, "Improved Video Categorization From Text Metadata and User Comments". Proceedings of the 34th International SCM SIGIR Conference on Research and Development in Information Retrieval. ACM, 2011.
Graham Pryor, "Attitudes and Aspirations in a Diverse World: The Project Store Perspective on Scientific Repositories". Ukoln, University of Bath, Digital Curation Center. The International Journal of Digital Curation, Issue 1, vol. 2, 2007. Nov. 2006.
U.S. Appl. No. 13/861,058 Non-Final Office Action Mailed Apr. 25, 2016.

\* cited by examiner

US 9,741,138 B2

NODE CLUSTER RELATIONSHIPS IN A GRAPH DATABASE

BACKGROUND

The present disclosure relates to the field of computers, and specifically to the use of databases in computers. Still more particularly, the present disclosure relates to node clusters in graph databases.

A database is a collection of data. Examples of database types include hierarchical databases, non-hierarchical databases, relational databases, graph databases, network databases, and object-oriented databases. Each type of database presents data in a non-dynamic manner, in which the data is statically stored.

SUMMARY

In one embodiment of the present invention, a processor-implemented method, system, and/or computer program product manages nodes in a graph database. Graph nodes in a graph database are organized into graph node clusters. A cluster edge, which describes a relationship between two of the graph node clusters, is generated to logically associate those two graph node clusters with one another.

DETAILED DESCRIPTION

Figure 1:
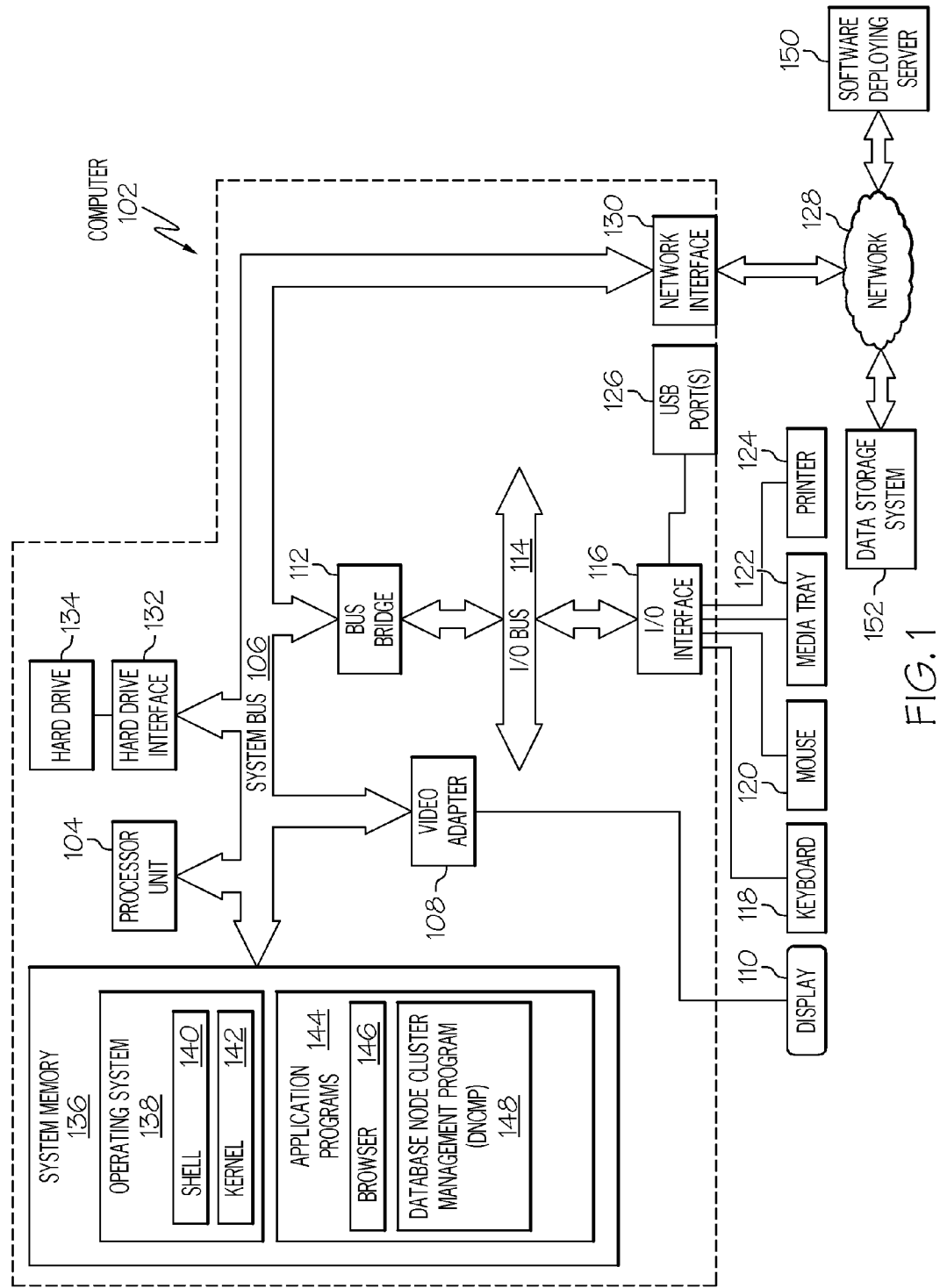
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a data storage system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a database node cluster management program (DNCMP) 148. DNCMP 148 includes code for implementing the processes described below, including those described in FIGS. 2-12. In one embodiment, computer 102 is able to download DNCMP 148 from software deploying server 150, including in an on-demand basis, wherein the code in DNCMP 148 is not downloaded until needed for execution. Note further that, in one embodiment of the present invention, software deploying server 150 performs all of the functions associated with the present invention (including execution of DNCMP 148), thus freeing computer 102 from having to use its own internal computing resources to execute DNCMP 148.

The data storage system 152 stores an electronic database, which in one embodiment is a hierarchical database, such as a graph database, a tree database, etc. In one embodiment, the data storage system 152 stores a non-hierarchical database, such as a relational database, etc. In one embodiment, computer 102 contains the synthetic context-based object database storage system described and claimed herein, while the database storage system is stored within hierarchical database storage system 152 and/or within computer 102.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note that DNCMP 148 is able to generate and/or utilize some or all of the databases depicted in the figures presented herein.

In one embodiment, the present invention provides a system for grouping graph nodes into clusters and then defining/managing the relationships between these graph node clusters. The graph nodes may be from a hierarchical database or a non-hierarchical database.

Figure 2:
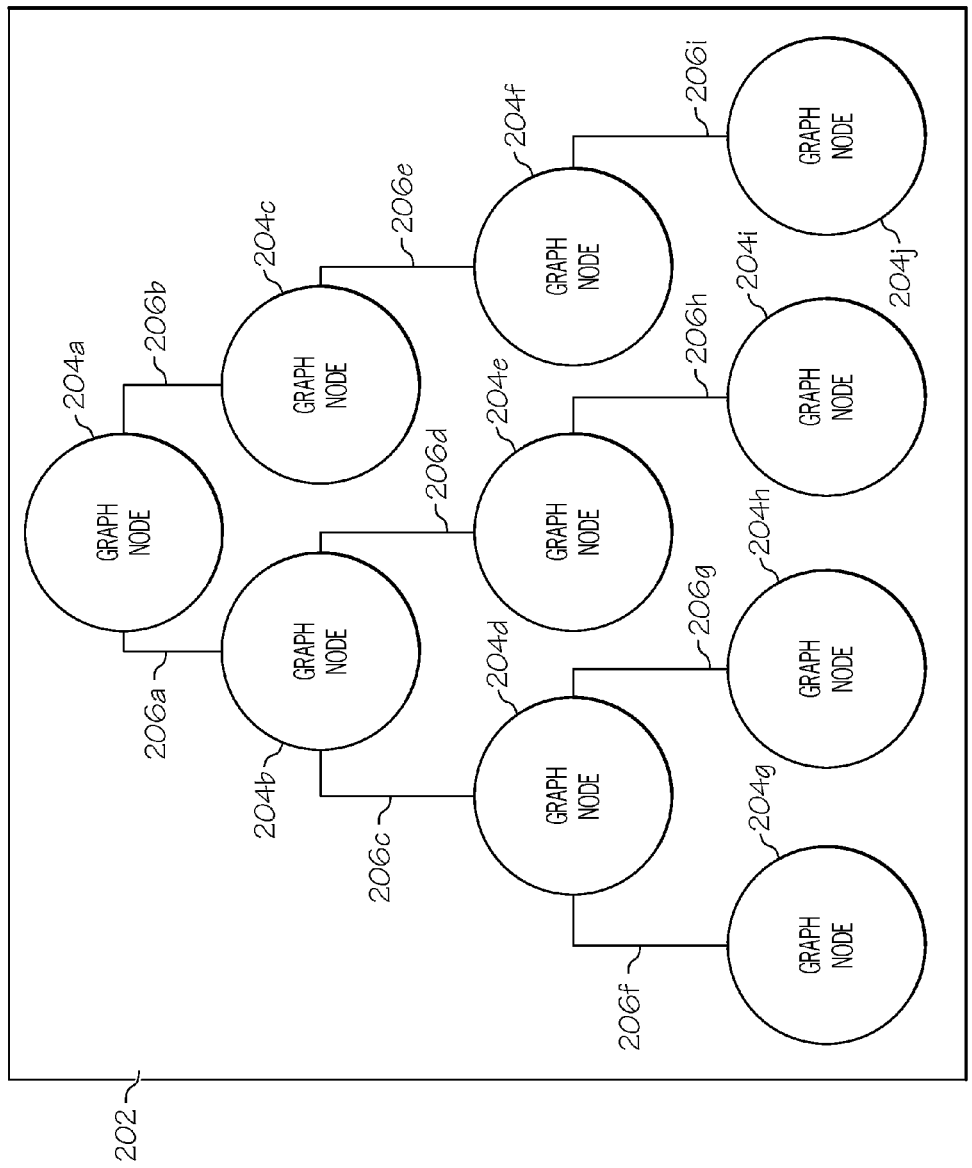
FIG. 2 illustrates an exemplary framework of a hierarchical database of graph nodes.

With reference now to FIG. 2, an exemplary hierarchical database 202, which is contained within a hierarchical database server such as data storage system 152 shown in FIG. 1, contains multiple graph nodes 204a-204j (indicating a "j" number of data nodes, where "j" is an integer).

In an embodiment in which the hierarchical database 202 is a graph database, such a graph database is a schema-less database in which data is organized as a set of nodes (objects) with properties (attributes or values). These nodes are linked to other nodes through graph node edges 206a-206i, which describe the relationship between two graph nodes. For example, if the graph nodes 204a-204j are data nodes, then graph node edge 206a may contain information the describes the data in graph node 204b as being a subset of the data found in graph node 204a. In another example, if the graph nodes 204a-204j are synthetic context-based objects (described below), then the graph node edges may describe shared (i.e., the same, equivalent, copies thereof, etc.) non-contextual data objects and/or shared (i.e., the same, equivalent, copies thereof, etc.) context objects between two synthetic context-based objects.

Regardless of whether the hierarchical database 202 is a graph database or another type of hierarchical database, the graph nodes 204a-204j in the hierarchical database are organized hierarchically (as the name "hierarchical database" indicates). That is, graph node 204a is at the top of the hierarchy, and is a parent graph node to lower graph nodes 204b-204c in a second tier. Similarly, graph nodes 204b and 204c are over graph nodes 204d-204f in a third tier, while graph nodes 204d-204f are over graph nodes 204g-204j in a fourth (bottom) tier. Thus, each parent graph node (from a higher tier) can have many children graph nodes (from one or more lower tiers).

The hierarchical database 202 depicted in FIG. 2 contains parent nodes that have a 1-to-many relationship with their children, grandchildren, great-grandchildren, etc. nodes, in which each parent graph node has many children, but each child graph node has only one parent graph node. Alternatively, the hierarchical database 202 may have children nodes that are linked to one or more parent nodes. Such a database (e.g., non-hierarchical database 402 depicted below in FIG. 4) is described as having parent/child nodes that have a many-to-many relationship.

Note that a higher hierarchy is defined as containing a parent graph node that describes data from multiple child graph nodes. Similarly, multiple child graph nodes from a lower hierarchy contain data that is inclusively described by data in a parent node. This parent node may be shared by sibling graph nodes (i.e., graph nodes within a same hierarchy that are all subordinate to the parent node), and/or the parent node may be shared by multi-generational (i.e., children, grand-children, etc.) graph nodes.

In one embodiment, the graph nodes depicted in FIG. 2 are data nodes. For example, consider hierarchical database 302 shown in FIG. 3. The data nodes 304a-304j are organized in a manner that is similar to that described above for graph nodes 204a-204j shown in FIG. 2, and are coupled by data node edges 304a-304i, as depicted. That is, data node 304a is in a top tier/hierarchy, while data nodes 304b-304c are in the next lower tier/hierarchy, data nodes 304d-304f are in the still lower tier/hierarchy, and data nodes 304g-304j are in the bottom tier/hierarchy.

Figure 3:
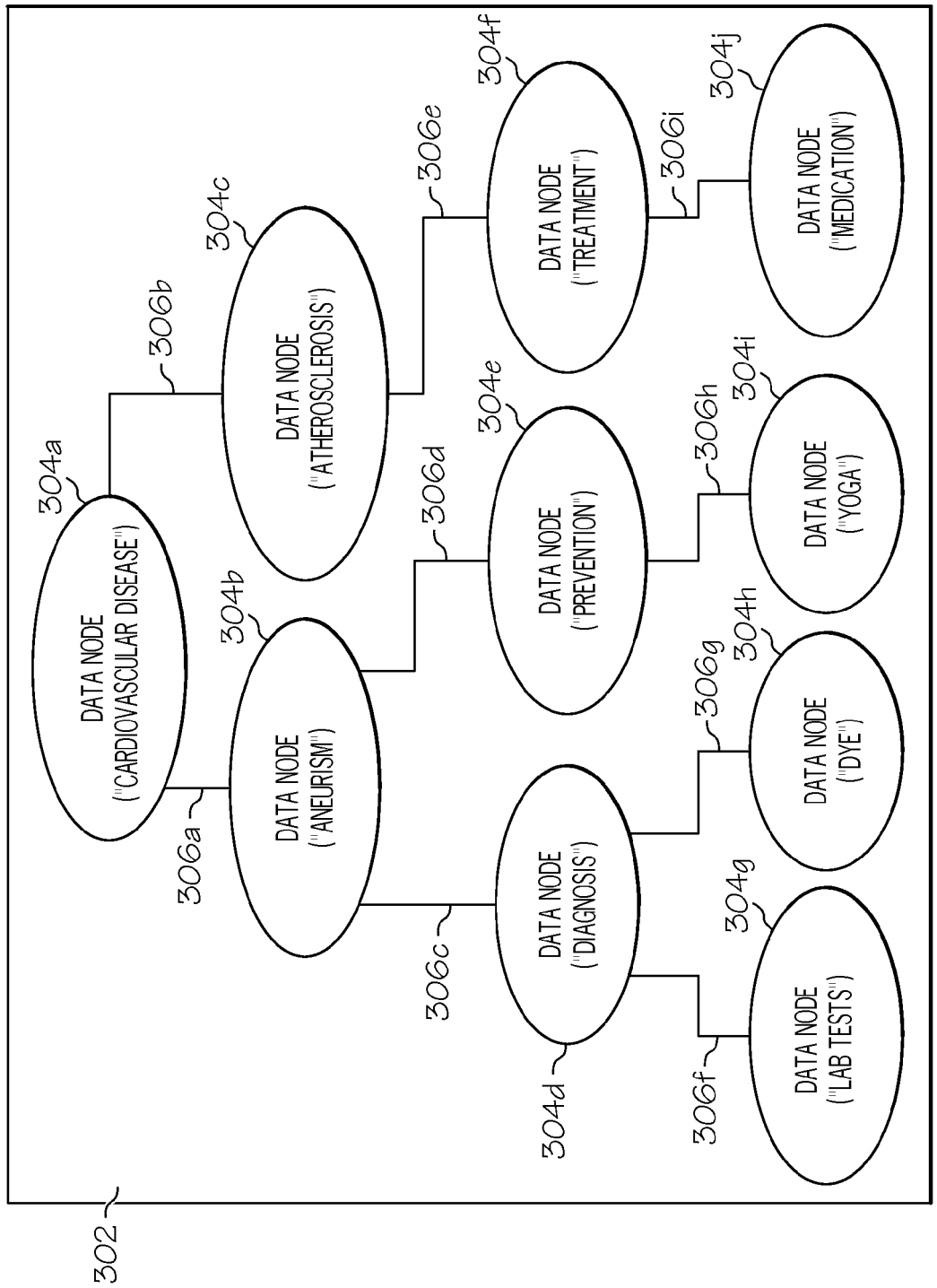
FIG. 3 depicts an exemplary hierarchical database of graph nodes.
Figure 4:
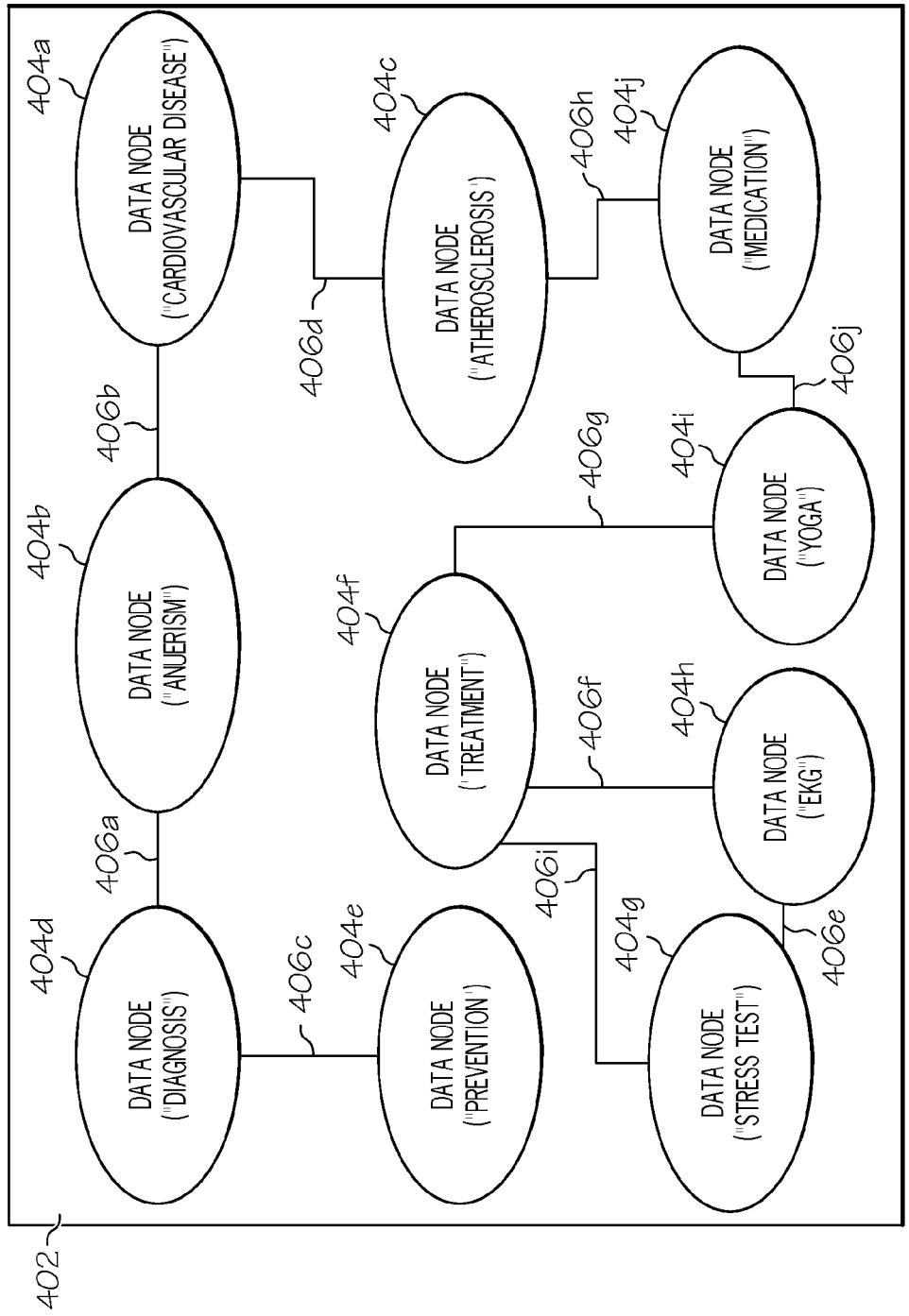
FIG. 4 illustrates depicts an exemplary non-hierarchical database of graph nodes.

In the example shown in FIG. 3, assume that the top data node 304a contains data about all types of "cardiovascular disease". As suggested by the name, "cardiovascular diseases" include diseases of the heart ("cardio") and blood vessels ("vascular"). As such, the depicted second tier includes data nodes about an aneurism (for "vascular"—see data node 304b) as well as a data node that includes data about atherosclerosis (for "cardio"—see data node 304c). Similarly, even lower-tiered data nodes 304d and 304e are below data node 304b, while data node 304f is below data node 304c. Likewise, data nodes 304g and 304h are below data node 304d, while data node 304i is below data node 304e and data node 304j is below data node 304f. Thus, while all of the data nodes 304a-304j are related to some variation of the context "cardiovascular disease", only data nodes 304a, 30fc, 304 f and 304j are related to the context of "cardiology", while data nodes 304a, 304b, 304d, 304e, 304g, 304h, and 304i are all within the context of "vascular diseases".

While the present invention has been demonstrated in the context of a hierarchical database 302 in FIG. 3, the use of a synthetic context-based object to point to data nodes having a same context is also useful in non-hierarchical databases. For example, consider the non-hierarchical database 402 depicted in FIG. 4, which includes data nodes 404a-404j (where "j" is an integer, indicating a "j" number of data nodes), which are coupled by data node edges 406a-406j, and which is contained within a non-hierarchical database server such as data storage system 152 shown in FIG. 1.

In one embodiment, the non-hierarchical database 402 is a relational database, which is a collection of data items (i.e., the data nodes 404a-404j) organized through a set of formally described tables. A table is made up of one or more rows, known as "tuples". Each of the tuples share common attributes, which in the table are described by column headings. Each tuple also includes a key, which may be a primary key or a foreign key. A primary key is an identifier (e.g., a letter, number, symbol, etc.) that is stored in a first data cell of a local tuple. A foreign key is typically identical to the primary key, except that it is stored in a first data cell of a remote tuple, thus allowing the local tuple to be logically linked to the foreign tuple.

In one embodiment, the non-hierarchical database 402 is an object oriented database, which stores objects (i.e., the data nodes 404a-404j). As understood by those skilled in the art of computer software, an object contains both attributes, which are data (i.e., integers, strings, real numbers, references to another object, etc.), as well as methods, which are similar to procedures/functions, and which define the behavior of the object. Thus, the object oriented database contains both executable code and data.

In one embodiment, the non-hierarchical database 402 is a spreadsheet, which is made up of rows and columns of cells. Each cell (i.e., one of the data nodes 404a-404j) contains numeric or text data, or a formula to calculate a value based on the content of one or more of the other cells in the spreadsheet.

Figure 5:
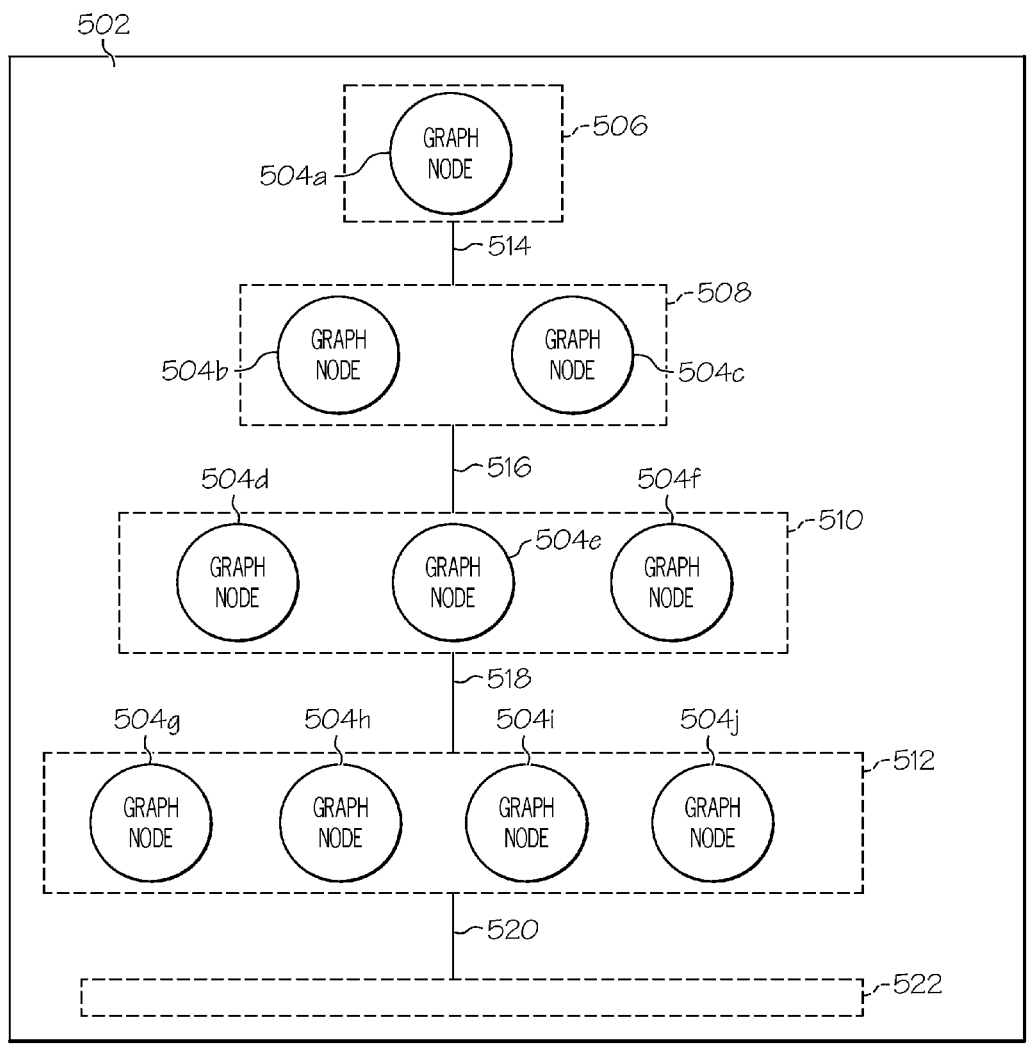
FIG. 5 depicts a hierarchical graph database that has graph node clusters logically coupled by cluster edges that describe a relationship between two graph node clusters.

With reference now to FIG. 5, a hierarchical graph database that has graph node clusters logically coupled by cluster edges that describe a relationship between two graph node clusters is presented. As depicted above in FIG. 2, individual graph nodes are logically coupled by graph node edges that describe a relationship between two graph nodes. FIG. 5, however, describes graph node clusters that are logically coupled by cluster edges. For example, assume that a hierarchical graph database 502 is made up of graph nodes 504a-504j (where "j" is an integer, indicating a "j" number of graph nodes), which are assigned to one of the graph node clusters 506, 508, 510, 512, or 522. Note that graph node cluster 506 currently only has one graph node (504a), but is still capable of holding additional graph nodes. Similarly, graph node cluster 522 currently is a null cluster (i.e., has no graph nodes within it), but is also capable of holding graph node(s) in the future.

As depicted for exemplary purposes, graph node cluster 506 is logically coupled to graph node cluster 508 by a cluster edge 514, which describes a relationship between graph node cluster 506 and graph node cluster 508. For example, assume that graph nodes 504a-504c are data nodes, and that graph node 504a describes some defined group (i.e., an enterprise with multiple divisions). Graph nodes 504b-504c could hold the names of these divisions, and cluster edge 514 would describe the divisions named in graph node cluster 508 as being part of the enterprise named in graph node cluster 506. Similarly, if graph node cluster 510 contains graph nodes that name various overlapping departments found in the enterprise divisions named in graph node cluster 508, then cluster edge 516 would describe this relationship. Similarly, if graph node cluster 512 contains graph nodes that name overlapping personnel who work in the various departments found in the graph nodes in graph node cluster 510, then cluster edge 518 would describe this relationship.

As noted above, graph node cluster 522 is initially a null cluster, as it contains no graph nodes. However, if graph node cluster 522 is populated with graph nodes in the future, then the cluster edge 520 would describe the relationship between these nodes and the graph node cluster 522. For example, if the graph node cluster 522 is later populated with familial dependents (in one graph node) and non-familial dependents (in another graph node) of the workers named in graph node cluster 512, then the cluster edge 520 would define this relationship.

Figure 6:
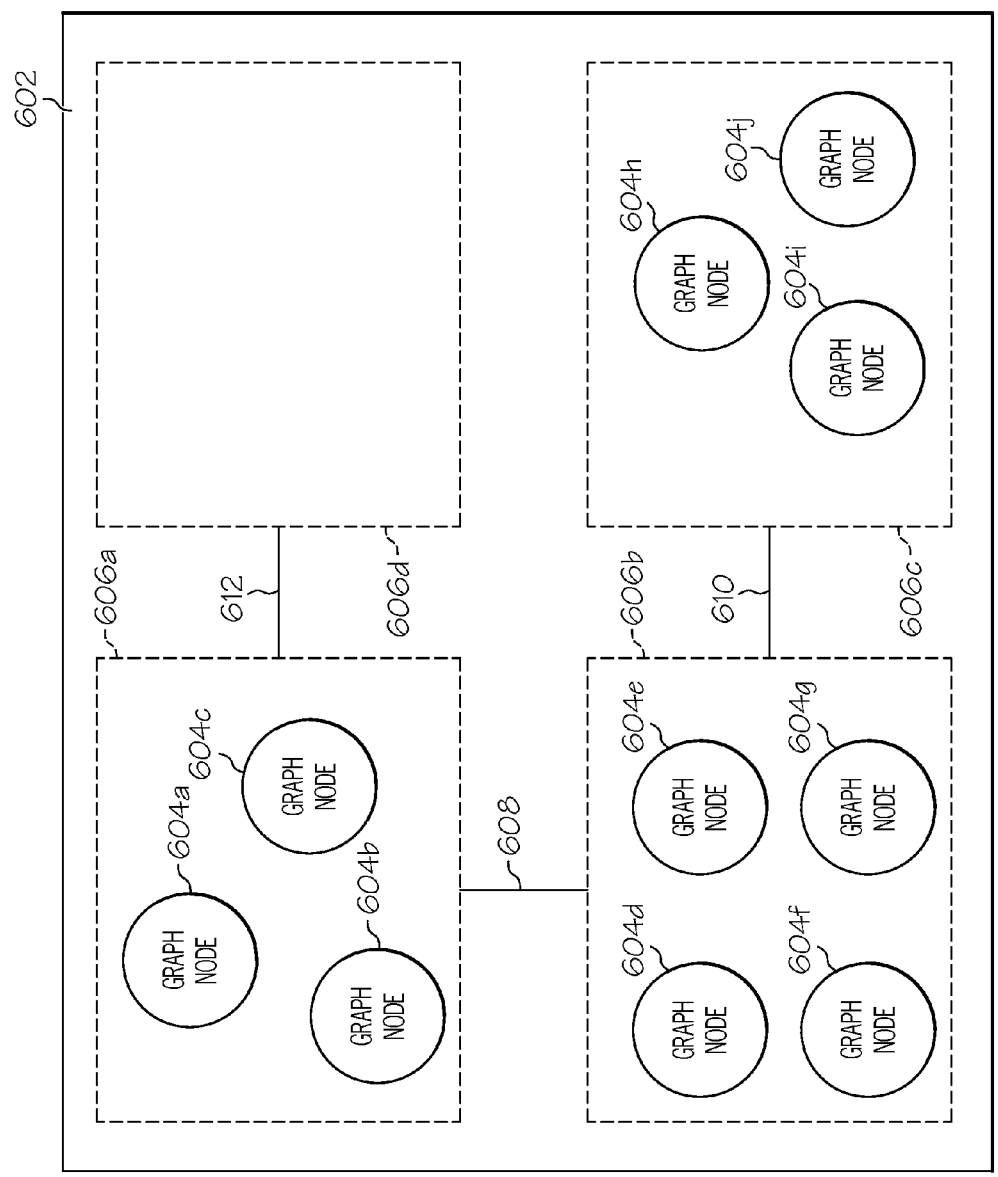
FIG. 6 illustrates a non-hierarchical graph database that has graph node clusters logically coupled by cluster edges that describe a relationship between two graph node clusters.

As noted herein, the presently disclosed cluster edges are also useful in a non-hierarchical graph database. With reference then to FIG. 6, a non-hierarchical graph database 602 that has graph node clusters 606a-660d logically coupled by cluster edges that describe a relationship between two graph node clusters. For example, consider graph node cluster 606a, which contains graph nodes 604a-604c. A cluster edge 608 describes a relationship between graph node cluster 606a and graph node cluster 606b (which contains graph nodes 604d-604g), while cluster edge 610 describes a relationship between graph node cluster 606b and graph node cluster 606c (which contains graph nodes 604h-604j).

Note that a cluster edge 612 describes a relationship between graph node cluster 606a and graph node cluster 606d, even though graph node cluster 606d is a null set. In one embodiment, cluster edge 612 is predefined, such that only graph nodes that meet the relational description found in cluster edge 612 are permitted to populate graph node cluster 606d. In another embodiment, however, the definition of cluster edge 612 is not established until graph node cluster 606d is populated with one or more graph nodes, at which time a determination is made as to the relationship between the graph nodes in graph node cluster 606a and graph node cluster 606d. This relationship is then presented in the cluster edge 612. Note further that this dynamic definition of a cluster edge can also be established in a hierarchical database (e.g., for cluster edge 518 shown in FIG. 5).

Note that in one embodiment, the relationship described in the cluster edge is based not only the graph node clusters that it connects, but also on upstream/downstream connections. For example, consider cluster edge 608 between graph node cluster 606a and graph node cluster 606b. As depicted, graph node cluster 606b is also coupled to graph node cluster 606c via cluster edge 610. In one embodiment, this relationship is also described by cluster edge 608. If the relationship between graph node cluster 606b and graph node cluster 606c were to be subsequently terminated (e.g., due to a change in rules for allowing linkage between graph node clusters, a change in security requirements, a change to the graph nodes within graph node cluster 606c, etc.), this will cause a new relationship between graph node cluster 606a and graph node cluster 606b. In one embodiment, this change of relationship is simply reflected in the cluster edge 608. Thus, logic such as DNCMP 148 shown in FIG. 1 will dynamically adjust the information stored in and displayed by a particular cluster edge based on what upstream/downstream edges exist relative to a graph node cluster that is connected to that particular cluster edge. In another embodiment, however, this change of relationship is so severe that graph node cluster 606a and graph node cluster 606b are no longer linked, and are thus terminated by logic such as DNCMP 148.

Figure 7:
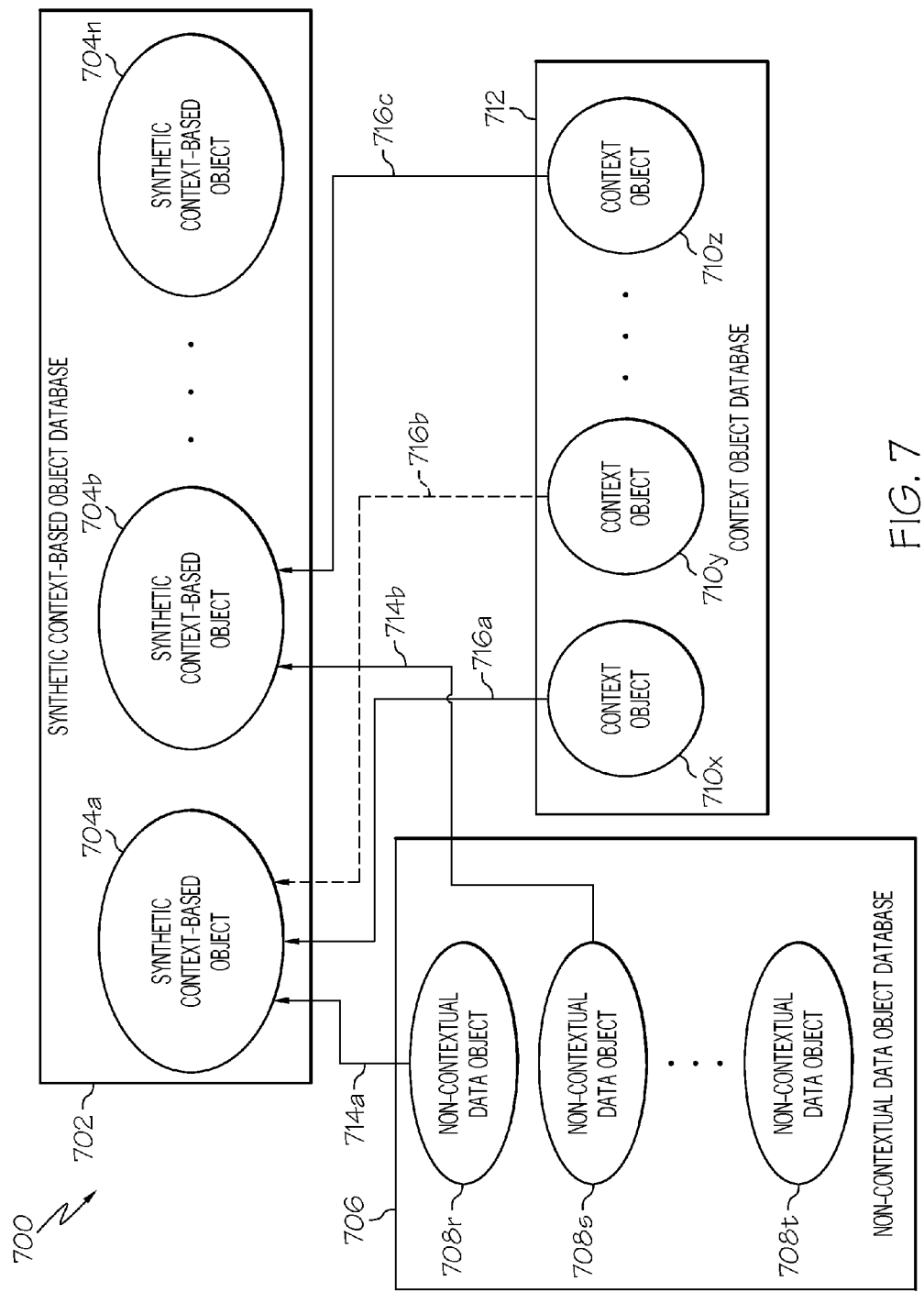
FIG. 7 depicts a creation of synthetic context-based objects that each contain an ambiguous non-contextual term.

In some embodiments of the present invention, the graph nodes depicted in the graph node clusters are data nodes. In other embodiments, however, these graph nodes are synthetic context-based objects. With reference now to FIG. 7, a process for generating one or more synthetic context-based objects in a system 700 is presented. Note that, in one embodiment, system 700 is a processing and storage logic found in computer 102 and/or data storage system 152 shown in FIG. 1, which process, support, and/or contain the databases, pointers, and objects depicted in FIG. 7.

Within system 700 is a synthetic context-based object database 702, which contains multiple synthetic context-based objects 704a-704n (thus indicating an "n" quantity of objects, where "n" is an integer). Each of the synthetic context-based objects 704a-704n is defined by at least one non-contextual data object and at least one context object. That is, at least one non-contextual data object is associated with at least one context object to define one or more of the synthetic context-based objects 704a-704n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 706 includes multiple non-contextual data objects 708r-708t (thus indicating a "t" quantity of objects, where "t" is an integer). However, data within each of these non-contextual data objects 708r-708t by itself is ambiguous, since it has no context. That is, the data within each of the non-contextual data objects 708r-708t is data that, standing alone, has no meaning, and thus is ambiguous with regards to its subject-matter. In order to give the data within each of the non-contextual data objects 708r-708t meaning, they are given context, which is provided by data contained within one or more of the context objects 710x-710z (thus indicating a "z" quantity of objects, where "z" is an integer) stored within a context object database 712. For example, if a pointer 714a points the non-contextual data object 708r to the synthetic context-based object 704a, while a pointer 716a points the context object 710x to the synthetic context-based object 704a, thus associating the non-contextual data object 708r and the context object 710x with the synthetic context-based object 704a (e.g., storing or otherwise associating the data within the non-contextual data object 708r and the context object 710x in the synthetic context-based object 704a), the data within the non-contextual data object 708r now has been given unambiguous meaning by the data within the context object 710x. This contextual meaning is thus stored within (or otherwise associated with) the synthetic context-based object 704a.

Similarly, if a pointer 714b associates data within the non-contextual data object 708s with the synthetic context-based object 704b, while the pointer 716c associates data within the context object 710z with the synthetic context-based object 704b, then the data within the non-contextual data object 708s is now given meaning by the data in the context object 710z. This contextual meaning is thus stored within (or otherwise associated with) the synthetic context-based object 704b.

Note that more than one context object can give meaning to a particular non-contextual data object. For example, both context object 710x and context object 710y can point to the synthetic context-based object 704a, thus providing compound context meaning to the non-contextual data object 708r shown in FIG. 7. This compound context meaning provides various layers of context to the data in the non-contextual data object 708r.

Note also that while the pointers 714a-714b and 716a-716c are logically shown pointing towards one or more of the synthetic context-based objects 704a-704n, in one embodiment the synthetic context-based objects 704a-704n actually point to the non-contextual data objects 708r-708t and the context objects 710x-710z. That is, in one embodiment the synthetic context-based objects 704a-704n locate the non-contextual data objects 708r-708t and the context objects 710x-710z through the use of the pointers 714a-714b and 716a-716c.

Figure 8:
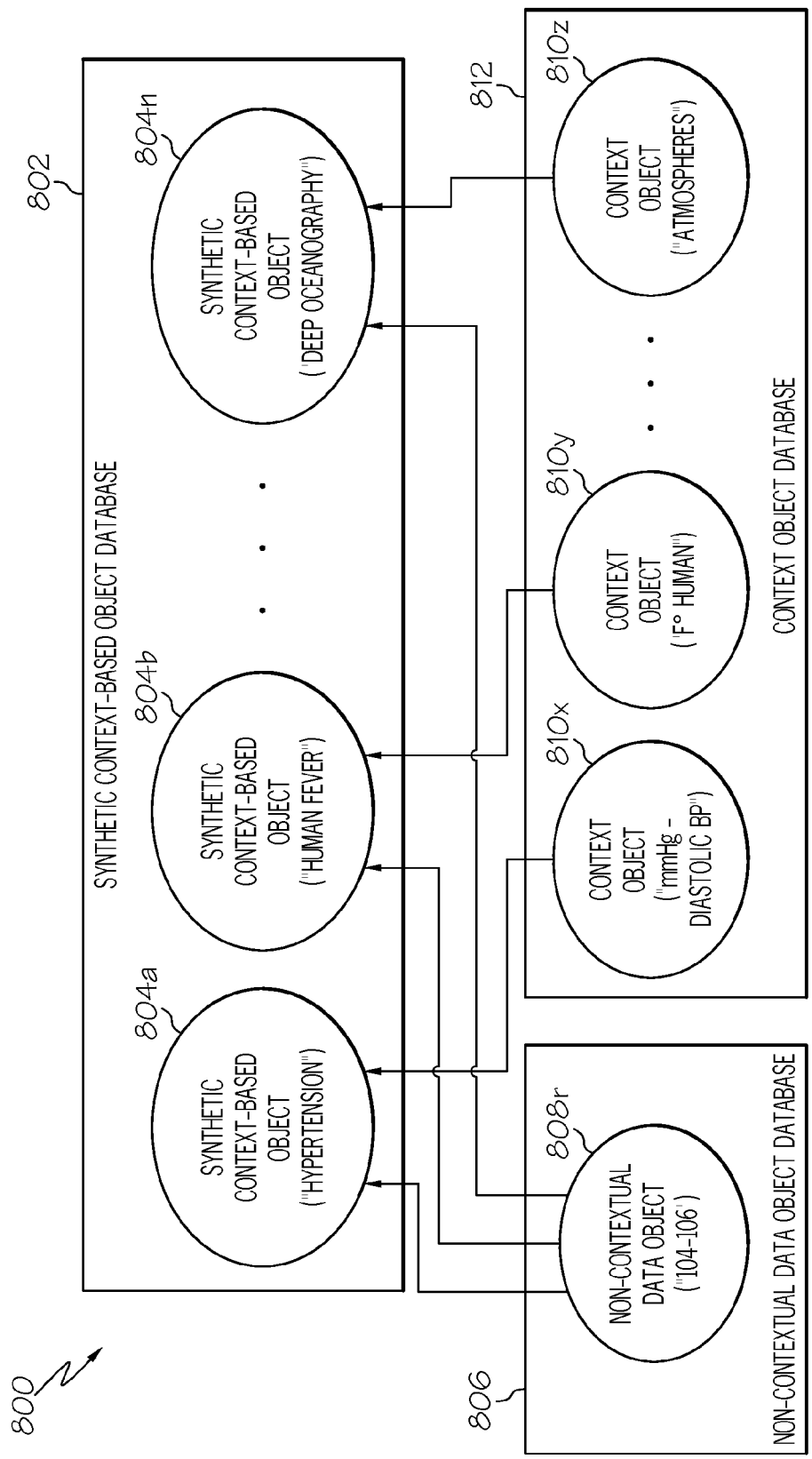
FIG. 8 illustrates a creation of synthetic context-based objects that each contain purely numerical non-contextual data.
Figure 9:
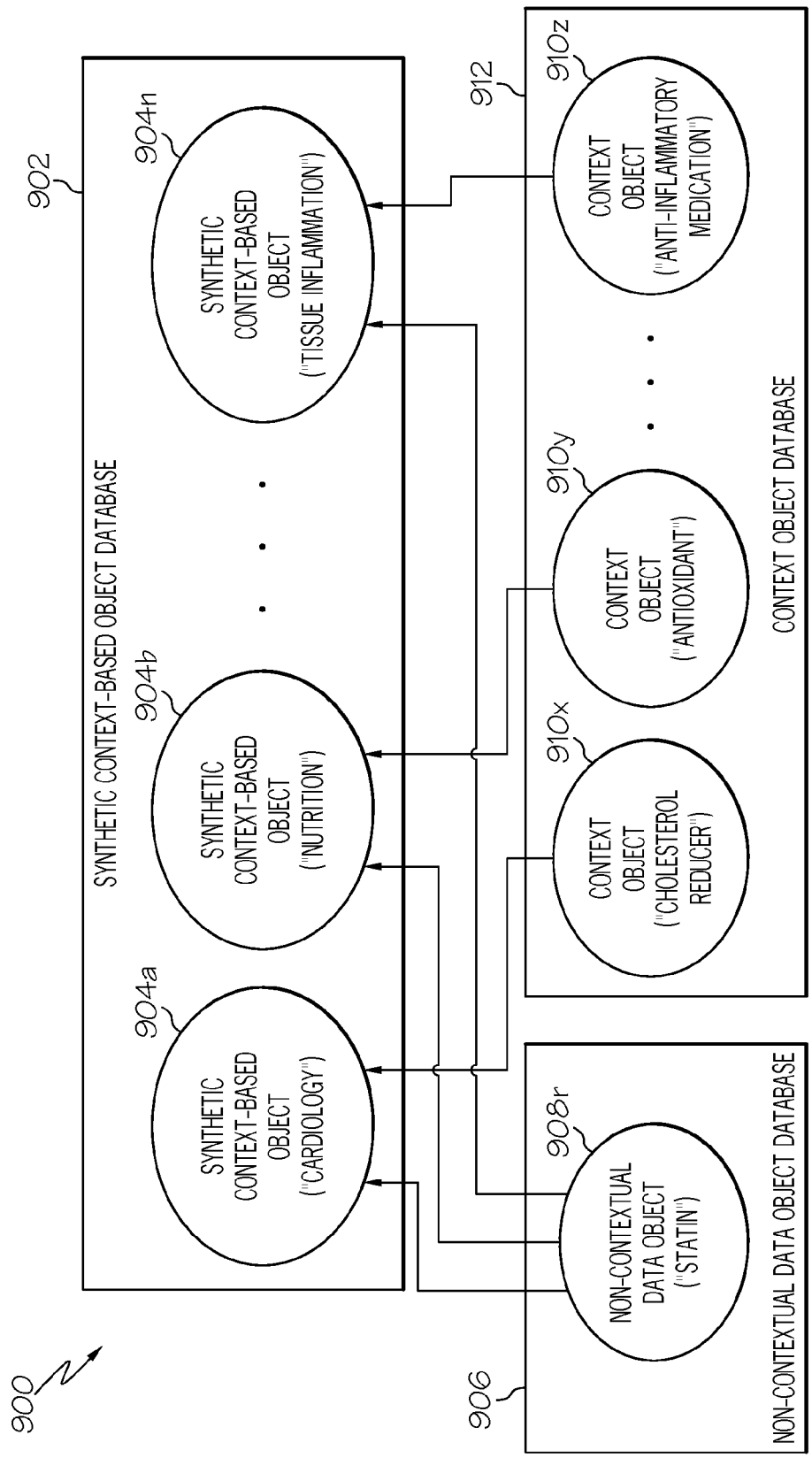
FIG. 9 depicts a creation of synthetic context-based objects based on a contextual use of a class of medicine.
Figure 10:
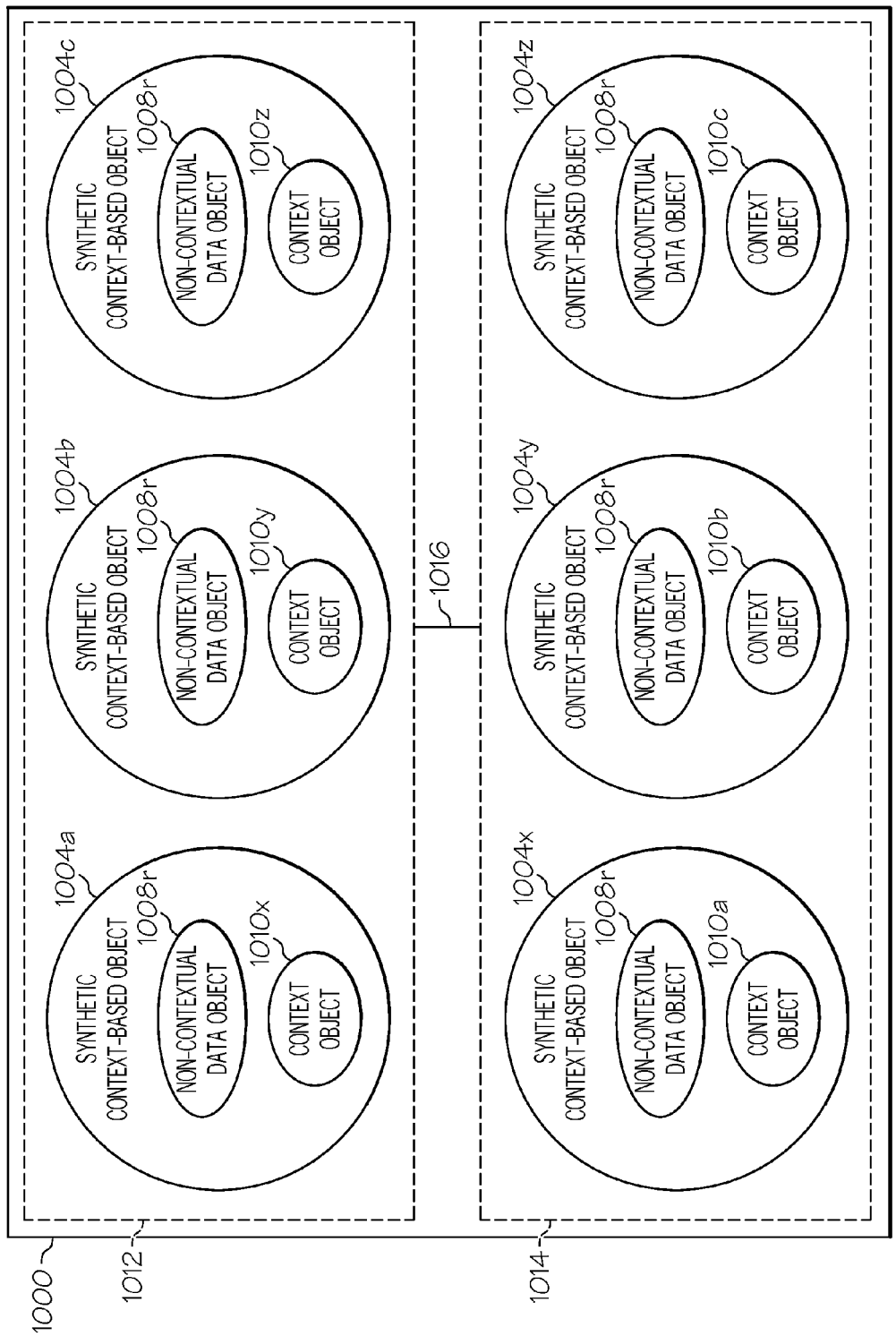
FIG. 10 illustrates graph node clusters that are defined by a common non-contextual data object.

Consider now an exemplary use case depicted in FIG. 8, showing a system 800 in which the data within a non-contextual data object 808r are merely a combination of numbers and/or letters, and thus are meaningless. In this example, the data "104-106" contained within a non-contextual data object 808r, standing alone without any context, are meaningless, identify no particular subject-matter, and thus are completely ambiguous. That is, "104-106" may relate to subject-matter such as a medical condition, a physics value, a person's age, a quantity of currency, a person's identification number, etc. In this example, the data "104-106" is so vague/meaningless that the data does not even identify the units that the term describes, much less the context of these units.

In the example shown in FIG. 8, then, data (i.e., the term/values "104-106") from the non-contextual data object 808r (found in a non-contextual data object database 806) are associated with (e.g., stored in or associated by a look-up table, etc.) a synthetic context-based object 804a, which is devoted to the subject-matter "hypertension". The term/values "104-106" from non-contextual data object 808r is also associated with a synthetic context-based object 804b, which is devoted to the subject-matter "human fever" and a synthetic context-based object 804n, which is devoted to the subject-matter "deep oceanography". In order to give contextual meaning to the term/values "104-106" (i.e., define the term/values "104-106") in the context of "hypertension", context object 810x, from a context object database 812 and which contains the context data "millimeters of mercury" and "diastolic blood pressure" is associated with (e.g., stored in or associated by a look-up table, etc.) the synthetic context-based object 804a. Thus, multiple data can provide not only the scale/units (millimeters of mercury) context of the values "104-106", but the data can also provide the context data "diastolic blood pressure" needed to identify the subject-matter (hypertension) of the synthetic context-based object 804a.

Associated with the synthetic context-based object 804b is a context object 810y, which provides the context/data of "degrees on the Fahrenheit scale" and "human" to the term/values "104-106" provided by the non-contextual data object 808r. Thus, the synthetic context-based object 804b now defines term/values "104-106" as that which is related to the subject matter of "human fever". Similarly, associated with the synthetic context-based object 804n is a context object 810z, which provides the context/data of "atmospheres" to the term/values "104-106" provided by the non-contextual data object 808r. In this case, the generator of the synthetic context-based object database 802 determines that high numbers of atmospheres are used to define deep ocean pressures. Thus, the synthetic context-based object 804n now defines term/values "104-106" as that which is related to the subject matter of "deep oceanography".

In one embodiment, the non-contextual data object may provide enough self-context to identify what the datum is, but not what it means and/or is used for. For example, consider the datum "statin" contained within the non-contextual data object 908r from a non-contextual data object database 906 shown in the system 900 in FIG. 9. In the example shown in FIG. 9, datum (i.e., the term "statin") from the non-contextual data object 908r is associated with (e.g., stored in or associated by a look-up table, etc.) a synthetic context-based object 904a, which is now part of a synthetic context-based object database 902 and which is devoted to the subject-matter "cardiology". The term "statin" from non-contextual data object 908r is also associated with a synthetic context-based object 904b, which is devoted to the subject-matter "nutrition" and a synthetic context-based object 904n, which is devoted to the subject-matter "tissue inflammation". In order to give contextual meaning to the term "statin" (i.e., define the term "statin") in the context of "cardiology", context object 910x, from context object database 912 and which contains the context data "cholesterol reducer" is associated with (e.g., stored in or associated by a look-up table, etc.) the synthetic context-based object 904a. Thus, the datum "cholesterol reducer" from context object 910x provides the context to understand that "statin" is used in the context of the subject-matter "cardiology".

Associated with the synthetic context-based object 904b is a context object 910y, which provides the context/datum of "antioxidant" to the term "statin" provided by the non-contextual data object 908r. That is, a statin has properties both as a cholesterol reducer as well as an antioxidant. Thus, a statin can be considered in the context of reducing cholesterol (i.e., as described by the subject-matter of synthetic context-based object 904a), or it may considered in the context of being an antioxidant (i.e., as related to the subject-matter of synthetic context-based object 904*b*). Similarly, a statin can also be an anti-inflammatory medicine. Thus, associated with the synthetic context-based object 904*n* is the context object 910*z*, which provides the context/data of "anti-inflammatory medication" to the term "statin" provided by the non-contextual data object 908*r*. This combination identifies the subject-matter of the synthetic context-based object 904*n* as "tissue inflammation".

Note that in one embodiment of the present invention, a cluster of synthetic context-based objects are linked by cluster edges. For example, consider the synthetic context-based object database 1000 depicted in FIG. 10. A graph node cluster 1012 includes synthetic context-based objects 1004*a*-1004*c*. Note that while each of the synthetic context-based objects 1004*a*-1004*c* is composed of a same non-contextual data object 1008*r*, each of the synthetic context-based objects 1004*a*-1004*c* is given context by a different context object from context objects 1010*x*-1010*z*. Note further that each of the synthetic context-based objects 1004*x*-1004*z* in graph node cluster 1014 is also composed of the same non-contextual data object 1008*r*, but here each of the synthetic context-based objects 1004*x*-1004*z* is given context by a different context object from context objects 1010*a*-1010*c*. The cluster edge 1016 thus identifies the shared non-contextual data object 1008*r* as being in all of the synthetic context-based objects that are within the graph node clusters 1012 and 1014. This sharing of the same non-contextual data object is the relationship between graph node cluster 1012 and graph node cluster 1014. This relationship is presented by (e.g., displayed by) the cluster edge 1016 (display of the relationship not shown in FIG. 10).

Figure 11:
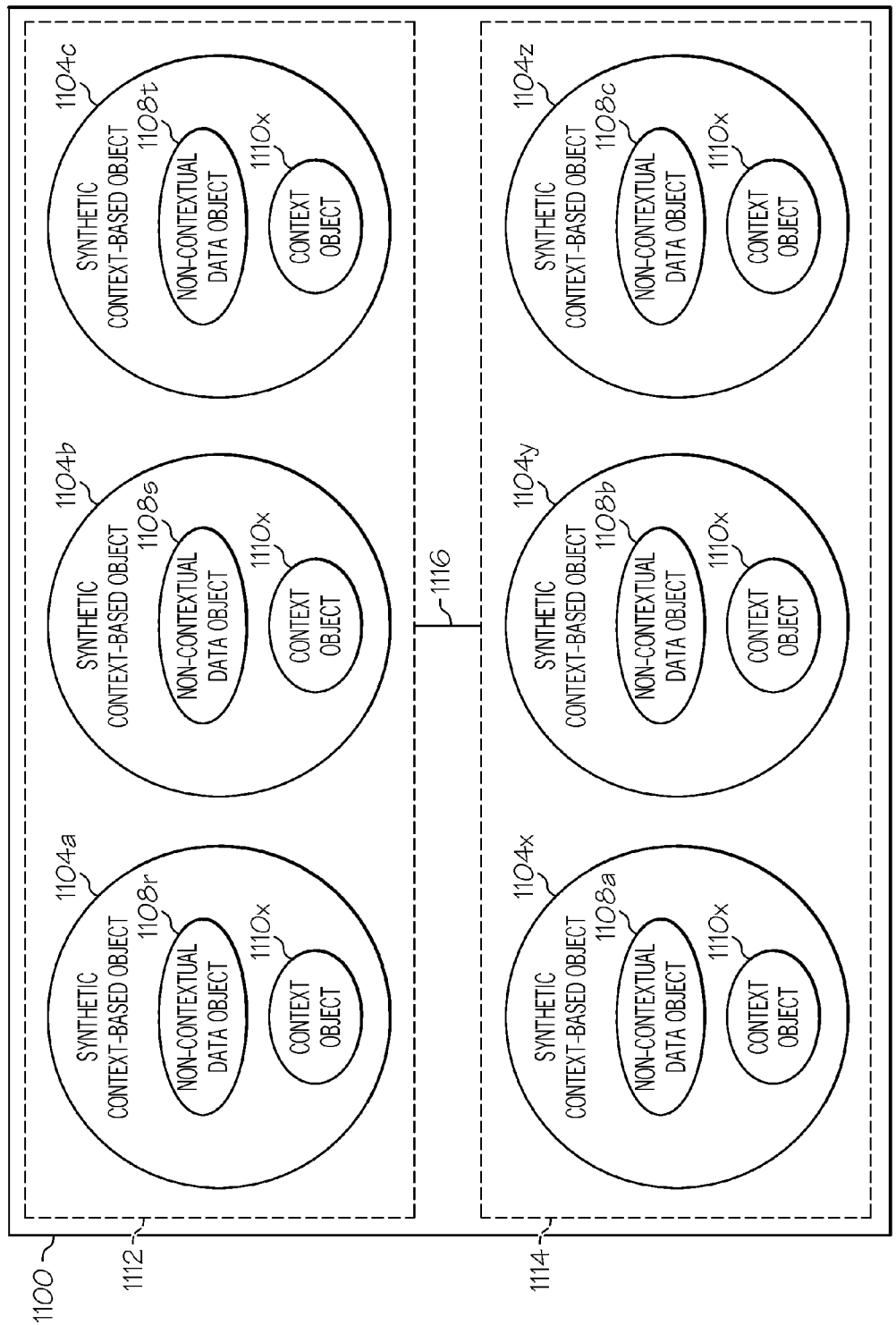
FIG. 11 depicts graph node clusters that are defined by a common context object.

Consider now the synthetic context-based object database 1100 depicted in FIG. 11. A graph node cluster 1112 includes synthetic context-based objects 1104*a*-1104*c*. In this embodiment, each of the synthetic context-based objects 1104*a*-1104*c* is composed of a different non-contextual data object from non-contextual data objects 1108*r*-1108*t*, but each of the synthetic context-based objects 1104*a*-1104*c* is given context by a same context object 1110*x*. Similarly, each of the synthetic context-based objects 1104*x*-1104*z* in graph node cluster 1114 is also composed of a different non-contextual data object from non-contextual data objects 1108*a*-1108*c*, but now each of the synthetic context-based objects 1104*x*-1104*z* is given context by the same context object 1110*x* that was used by the synthetic context-based objects 1104*a*-1104*c* in graph node cluster 1112. The cluster edge 1116 thus identifies the shared context object 1110*x* as being in all of the synthetic context-based objects that are within the graph node clusters 1112 and 1114.

Figure 12:
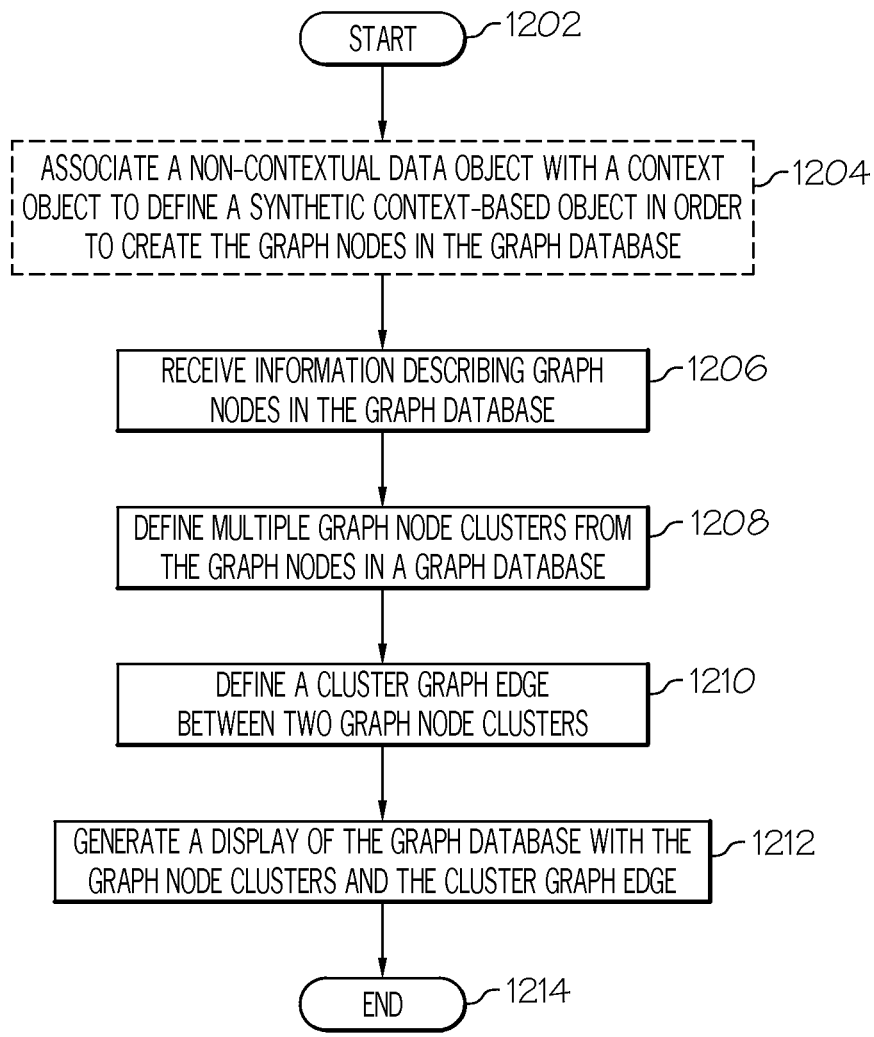
FIG. 12 is a high-level flow chart of one or more steps performed by a computer processor to manage node clusters in a graph database.

With reference now to FIG. 12, a high-level flow chart of one or more steps performed by a computer processor to manage nodes in a graph database is presented. After initiator block 1202, a processor receives a data stream that describes graph nodes in a graph database (block 1206). These graph nodes are data nodes or synthetic context-based objects, as described herein. Thus, in one embodiment, the graph nodes are from previously defined synthetic context-based objects, which are created in previous block 1204. In order to create such synthetic context-based objects, a non-contextual data object is associated by a processor with a context object to define a synthetic context-based object. This non-contextual data object ambiguously relates to multiple subject-matters. However, the context object provides a context that identifies a specific subject-matter, from the multiple subject-matters, of the non-contextual data object, as described herein. That is, as described herein, the non-contextual data object ambiguously relate to multiple subject-matters. Standing alone, it is unclear to which of these multiple-subject matters the data in the non-contextual data object is directed. However, the context object provides a context that identifies a specific subject-matter, from the multiple subject-matters, of the non-contextual data object.

As described above and stated in block 1208, multiple graph node clusters are defined from the graph nodes in the graph database. If the graph nodes are data nodes, then they can be grouped into graph node clusters according to any user-selected criteria, including but not limited to, the data nodes containing data that all relate to a particular job project, a same geographical area, a same hobby or sports activity, etc. In an embodiment in which the graph nodes are synthetic context-based objects, then (as described above) the graph node clusters may be grouped according to whether the synthetic context-based objects share a common non-contextual data object or a common context object.

As described in block 1210, a cluster edge is then generated to logically link (i.e., is between) two graph node clusters from the multiple graph node clusters in the graph database. This cluster edge describes a relationship between the two graph node clusters. For example, if the graph node clusters are synthetic context-based objects graph node clusters, then the cluster edge is a context-based cluster edge that identifies a shared (i.e., either a replicated object or truly sharing a same object) non-contextual data object or a shared context object.

As described in block 1212, a display of the graph database is then generated, showing the two graph node clusters and the cluster edge that logically couples the two graph node clusters (along with details of the relationship between the graph node clusters that the cluster edge logically couples). The process ends at terminator block 1214.

The graph node clusters described here thus present an improved framework for computation, storage, communication, and privacy/security. For example, computation is improved since details of the contents of a graph node cluster are not needed, since the information in the cluster edges. Communication is improved since only a small limited representation of the graph node clusters and/or their cluster edges can be cached on a separate, remote physical node. Privacy and security is enhanced since, in one embodiment, only information in the cluster edges, not the details of the contents of the node clusters, can be sent to parties who are not allowed to view the contents of the graph nodes in the clusters.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of improving a computer system, the processor-implemented method comprising:
   receiving, by the processor, a data stream that describes graph nodes in a non-hierarchical graph database, wherein each of the graph nodes represents a synthetic context-based object, and wherein synthetic context-based objects are generated by:
      associating, by the processor, a non-contextual data object with a context object to define a synthetic context-based object, wherein the non-contextual data object ambiguously relates to multiple subject-matters, and wherein the context object provides a context that identifies a specific subject-matter, from the multiple subject-matters, of the non-contextual data object, wherein the synthetic context-based object, the non-contextual data object, and the context object are in a same processing and storage logic, and wherein the synthetic context-based object points to the non-contextual data object and the context object;
   defining, by the processor, multiple graph node clusters from the graph nodes in the non-hierarchical graph database, wherein the multiple graph node clusters share a common non-contextual data object;
   generating, by the processor, a cluster edge between two graph node clusters from the multiple graph node clusters in the non-hierarchical graph database, wherein the cluster edge describes a relationship between the two graph node clusters by identifying the common non-contextual data object;
   transmitting, by the processor, only information in the cluster edge to a party that is not allowed to view contents of the graph nodes in the non-hierarchical graph database, wherein transmitting only the information in the cluster edge enhances security of the non-hierarchical graph database;
   communicating, by the processor, the information from the cluster edge without the content of the graph nodes to a cache at a remote location, wherein communicating the information from the cluster edge without the content of the graph nodes reduces communication bandwidth consumption for a network that is coupled to the cache, and wherein communicating the information from the cluster edge without the content of the graph nodes reduces an amount of storage consumed in the cache; and
   executing, by the processor, a computation using only information stored in the cache that came from the cluster edge without the content of the graph nodes, wherein execution of the computation is improved by using only information from the cluster edge without the content of the graph nodes.

2. The processor-implemented method of claim 1, further comprising:
   generating a display of the non-hierarchical graph database, wherein the non-hierarchical graph database comprises the two graph node clusters, the cluster edge, and details of the relationship between the two graph node clusters.

3. The processor-implemented method of claim 1, wherein the graph nodes represent data nodes.

4. The processor-implemented method of claim 1, further comprising:
   combining, by the processor, synthetic context-based objects that each contain a same non-contextual data object and a different context object from a first set of context objects into a first synthetic context-based objects graph node cluster;
   combining, by the processor, synthetic context-based objects that each contain the same non-contextual data object and a different context object from a second set of different context objects into a second synthetic context-based objects graph node cluster; and
   displaying, by the processor, the same non-contextual data object in a context-based cluster edge that links the first synthetic context-based objects graph node cluster to the second synthetic context-based objects graph node cluster.

5. The processor-implemented method of claim 1, further comprising:
   combining, by the processor, synthetic context-based objects that each contain a different non-contextual data object from a first set of non-contextual data objects and a same context object into a first synthetic context-based objects graph node cluster;
   combining, by the processor, synthetic context-based objects that each contain a different non-contextual data object from a second set of non-contextual data objects and the same context object into a second synthetic context-based objects graph node cluster; and displaying, by the processor, the same context object in a context-based cluster edge that links the first synthetic context-based objects graph node cluster to the second synthetic context-based objects graph node cluster.

6. The processor-implemented method of claim 1, wherein at least one of the two graph node clusters is empty, wherein an empty graph node cluster provides a structure for holding graph nodes at a future time.

7. A computer program product for improving a computer system, the computer program product comprising a tangible non-transitory computer readable storage medium having program code embodied therewith, the program code readable and executable by a processor to perform a method comprising:

receiving a data stream that describes graph nodes in a non-hierarchical graph database;

defining multiple graph node clusters from the graph nodes in the non-hierarchical graph database;

generating a cluster edge between two graph node clusters from the multiple graph node clusters in the non-hierarchical graph database, wherein the cluster edge describes a relationship between the two graph node clusters, and wherein the relationship between the two graph node clusters comprises a description of an upstream connection from one of the graph node clusters to an upstream node cluster, and wherein the relationship between the two graph node clusters comprises a description of a downstream connection from one of the graph node clusters to a downstream node cluster;

transmitting only information in the cluster edge to a party that is not allowed to view contents of the graph nodes in the non-hierarchical graph database, wherein transmitting only the information in the cluster edge enhances security of the non-hierarchical graph database;

communicating the information from the cluster edge without the content of the graph nodes to a cache at a remote location, wherein communicating the information from the cluster edge without the content of the graph nodes reduces communication bandwidth consumption for a network that is coupled to the cache, and wherein communicating the information from the cluster edge without the content of the graph nodes reduces an amount of storage consumed in the cache; and executing a computation using only information stored in the cache that came from the cluster edge without the content of the graph nodes, wherein execution of the computation is improved by using only information from the cluster edge without the content of the graph nodes.

8. The computer program product of claim 7, wherein program code further comprises instructions that are readable and executable by the processor for:

generating a display of the non-hierarchical graph database, wherein the non-hierarchical graph database comprises the two graph node clusters and the cluster edge.

9. The computer program product of claim 7 wherein the graph nodes represent data nodes.

10. The computer program product of claim 7, wherein the graph nodes represent synthetic context-based objects, and wherein program code further comprises instructions that are readable and executable by the processor for:

associating a non-contextual data object with a context object to define a synthetic context-based object, wherein the non-contextual data object ambiguously relates to multiple subject-matters, and wherein the context object provides a context that identifies a specific subject-matter, from the multiple subject-matters, of the non-contextual data object.

11. The computer program product of claim 10, wherein program code further comprises instructions that are readable and executable by the processor for:

combining synthetic context-based objects that each contain a same non-contextual data object and a different context object from a first set of context objects into a first synthetic context-based objects graph node cluster;

combining synthetic context-based objects that each contain the same non-contextual data object and a different context object from a second set of different context objects into a second synthetic context-based objects graph node cluster; and displaying the same non-contextual data object in a context-based cluster edge that links the first synthetic context-based objects graph node cluster to the second synthetic context-based objects graph node cluster.

12. The computer program product of claim 10, wherein program code further comprises instructions that are readable and executable by the processor for:

combining synthetic context-based objects that each contain a different non-contextual data object from a first set of non-contextual data objects and a same context object into a first synthetic context-based objects graph node cluster;

combining synthetic context-based objects that each contain a different non-contextual data object from a second set of non-contextual data objects and the same context object into a second synthetic context-based objects graph node cluster; and displaying the same context object a context-based cluster edge that links the first synthetic context-based objects graph node cluster to the second synthetic context-based objects graph node cluster.

13. The computer program product of claim 7, wherein at least one of the two graph node clusters is empty, wherein an empty graph node cluster provides a structure for holding graph nodes at a future time.

14. A computer system comprising:

a processor, a computer readable memory, and a computer readable storage medium;

first program instructions to receive a data stream that describes graph nodes in a non-hierarchical graph database;

second program instructions to define multiple graph node clusters from the graph nodes in the non-hierarchical graph database; and third program instructions to generate a cluster edge between two graph node clusters from the multiple graph node clusters in the non-hierarchical graph database, wherein the cluster edge describes a relationship between the two graph node clusters;

fourth program instructions to associate a non-contextual data object with a context object to define a synthetic context-based object, wherein the non-contextual data object ambiguously relates to multiple subject-matters, and wherein the context object provides a context that identifies a specific subject-matter, from the multiple subject-matters, of the non-contextual data object;

fifth program instructions to combine synthetic context-based objects that each contain a same non-contextual data object and a different context object from a first set of different context objects into a first synthetic context-based objects graph node cluster;

sixth program instructions to combine synthetic context-based objects that each contain the same non-contextual data object and a different context object from a second set of different context objects into a second synthetic context-based objects graph node cluster;

seventh program instructions to display the same non-contextual data object in a context-based cluster edge that links the first synthetic context-based objects graph node cluster to the second synthetic context-based objects graph node cluster;

eighth program instructions to transmit only information in the cluster edge to a party that is not allowed to view contents of the graph nodes in the non-hierarchical graph database, wherein transmitting only the information in the cluster edge enhances security of the non-hierarchical graph database;

ninth program instructions to communicate the information from the cluster edge without the content of the graph nodes to a cache at a remote location, wherein communicating the information from the cluster edge without the content of the graph nodes reduces communication bandwidth consumption for a network that is coupled to the cache, and wherein communicating the information from the cluster edge without the content of the graph nodes reduces an amount of storage consumed in the cache; and tenth program instructions to execute a computation using only information stored in the cache that came from the cluster edge without the content of the graph nodes, wherein execution of the computation is improved by using only information from the cluster edge without the content of the graph nodes; and wherein the first, second, third, fourth, fifth, sixth, seventh, eighth, ninth, and tenth program instructions are stored on the computer readable storage medium for execution by the processor via the computer readable memory.

15. The computer system of claim 14, further comprising:
eleventh program instructions generate a display of the non-hierarchical graph database, wherein the non-hierarchical graph database comprises the two graph node clusters and the cluster edge; and wherein
the eleventh program instructions are stored on the computer readable storage medium for execution by the processor via the computer readable memory.

16. The computer system of claim 14, wherein the graph nodes represent data nodes.

17. The computer system of claim 14, wherein the relationship between the two graph node clusters comprises a description of an upstream connection from one of the graph node clusters to an upstream node cluster.

18. The computer system of claim 14, wherein the relationship between the two graph node clusters comprises a description of a downstream connection from one of the graph node clusters to a downstream node cluster.

19. The computer system of claim 14, wherein the non-contextual data is meaningless without the context objects.

* * * * *